3,338,973
PURIFICATION OF UNSYMMETRICAL
TETRAHALOACETONES
Michael Kokorudz, Southgate, Mich., assignor to Wyandotte Chemicals Corporation, Wyandotte, Mich., a corporation of Michigan
No Drawing. Filed Oct. 10, 1963, Ser. No. 315,395
9 Claims. (Cl. 260—593)

The present invention relates to the purification of haloacetones, and is more particularly cocerned with a novel process for the purification, at temperatures above room temperature, of haloacetones which form water-insoluble hydrates in the presence of water.

Haloacetones, and especially unsymmetrical tetrahaloacetones, are valuable chemical intermediates. For example 1,1,1,3-tetrachloroacetone may be dehydrohalogenated to produce 1,1,1-trichloro-2,3-epoxypropane, an intermediate which is in turn useful for the preparation of halogenous polymers such as fire-resistant plastics. The haloacetones have traditionally been produced in small yields by the reaction of about four molar proportions of halogen with about one molar proportion of acetone. A process recently has been developed for the halogenation of 1,1,1-trihaloacetones in the presence of a sulfuric acid catalyst to produce 1,1,1,3-haloacetones. However, the tetrahaloacetones produced by this process form an insoluble hydrate in the presence of water which entraps small amounts of difficulty-removable sulfuric acid as an impurity.

Attempts to purify the insoluble product by washing with distilled water under normal, e.g., room temperature, conditions have met with failure. Consequently, it has in the past been necessary to purify the product by separation of the sulfuric acid, treatment of the tetrahaloacetone with magnesium oxide, and subsequent filtration to remove the insoluble magnesium sulfate and unreacted magnesium oxide. As is readily apparent, such a procedure is complicated and uneconomical.

It is therefore an object of the present invention to provide a novel method for purifying, at temperatures above room temperature, haloacetones which form such insoluble hydrates. It is a further object to provide a method for purifying such haloacetones which are produced in the presence of a sulfuric acid catalyst, and wherein a portion of the sulfuric acid remains as an impurity. It is a particular object to provide a method for purifying 1,1,1,3-tetrachloroacetone produced by the selective chlorination of 1,1,1-trichloroacetone in the presence of sulfuric acid. Additional objects will be apparent to one skilled in the art and still other objects will become apparent hereinafter.

The foregoing and additional objects are accomplished by washing the haloacetone in an aqueous system maintained at a temperature above the temperature at which the haloacetone hydrate dissociates, and removing the aqueous phase containing the water-insoluble impurities while the temperature of the system is still above the dissociation temperature.

The materials which may be treated by the process of the present invention are haloacetones and particularly 1,1,1,3-tetrahaloacetones, for examples, 1,1,1,3-tetrachloroacetone and 1-bromo-1,1,3-trichloroacetone, the corresponding fluorochloro and fluorobromo compounds, tetrahaloacetones having only one kind of halogen therein, and related tetrahaloacetones containing one or more iodine atoms which compounds contain water-soluble impurities, such as sulfuric or hydrochloric acid, acetone, or the like.

The present process is particularly suitable for the purification of haloacetones which are prepared by a process utilizing sulfuric acid as a catalyst. It has been found that many of these haloacetones form an insoluble hydrate in the presence of water which traps a portion of the catalyst, rendering purification difficult. According to the present invention, a limited amount of water is added to the product, and the temperature of the system is raised to a value above that at which the hydrate dissociates or melts. The amount of water added is preferably the minimum amount necessary to dissolve the sulfuric acid, without substantial dissolution of any of the product. It has been found that the present process may be advantageously carried out by adding only sufficient water to form an aqueous solution containing about 20% to about 25% sulfuric acid when all the sulfuric acid has been dissolved. At this concentration, the acid may be effectively removed without substantial loss of the desired product.

Conventional methods may be used for the present purification process. The requisite amount of water may be added and washing and separation carried out as by shaking in a separatory funnel, washing in a counter-current feed apparatus, or the like. After the water is added, the temperature of the system is adjusted to a value at which the hydrate dissociates preferably in a range of about 45° to about 65° C. Alternatively, either one of the components may be separately heated prior to addition to a temperature such that a suitable temperature will be obtained when the components are mixed together. After complete mixing has been accomplished, the layers are permitted to settle, and the lower layer then removed. In order to obtain good separation it is important that the temperature of the reaction mixture be maintained within the stated range during the time the two layers are permitted to stand as well as during the separation process.

The process according to the present invention can be used to purify either individual haloacetones, or mixtures containing more than one haloacetone. Mixtures containing the 1,1,1,3-tetrahaloacetones may be treated according to the present process prior to separation of the 1,1,1,3-tetrahaloacetones as a step in the purification of said mixtures or alternatively, the 1,1,1,3-tetrahaloacetones may be treated after separation from the reaction mixture and in more or less purified condition.

The present process is suitable for use in the purification of any of the haloacetones which form insoluble hydrates with water. In addition to the sulfuric acid catalysts, other water-soluble impurities are removed such as hydrochloric acid and degradation or decomposition products or lower-halogenated acetones which might have formed during the chlorination reaction.

The critical temperature at which the haloacetone hydrate dissociates varies with the different haloketones. The precise value can be easily determined by simple procedures. It has been found that the dissociation temperature for 1,1,1,3-tetrachloroacetone is about 45° C. Preferably the temperature of the purification system should be maintained at about 55° to 65° C. The optimum temperature is about 60° C. The following examples are given by way of illustration only and are not to be construed as limiting.

*Example 1*

Chlorine (420 grams, 5.91 moles) was introduced into a mixture of 2436 grams (11.83 moles) of 1-bromo-1,1-dichloroacetone and 395 grams (four moles) of sulfuric acid at a temperature of 25° to 36° C.

Hydrochloric acid was partially removed by passing air through the product and the residue poured into 1.5 liters of water maintained at a temperature of 50° to 60° C. The lower, organic layer was separated, washed with another 1.5 liters of water maintained at a temperature of about 50° to 60° C., and dried over magnesium sulfate. The water washings were extracted with 250 milliliters of carbon tetrachloride which was then removed by distillation to leave 115 grams of residue.

This residue was combined with the main product and the combined product distilled to give 41 grams of a forerun, 120 grams of unreacted 1-bromo-1,1-dichloroacetone, 57 grams of a mixture of 1-bromo-1,1-dichloroacetone and 1-bromo-1,1,3-trichloroacetone, 1063 grams of 1-bromo-1,1,3-trichloroacetone, and 21 grams of residue. The conversion was 38% and the yield was 77%.

Analysis of product.—Calculated for $C_3H_2OCl_3Br$: Cl, 44.0%; Br, 33. Found: Cl, 44.7%; Br, 32.

The thus-isolated 1-bromo-1,1,3-trichloroacetone was free of sulfuric acid and other water-soluble impurities, and contained no hydrate.

*Example 2*

Four moles (646 grams) of 1,1,1-trichloroacetone followed by 0.69 mole (68 grams; 0.172 mole equivalent) of 99.4% sulfuric acid were introduced into a three-necked one-liter reaction flask, fitted with a stirrer, a gas dispenser, thermometer well and Dry Ice-acetone reflux condenser. The reaction mixture was stirred and warmed to a temperature of 50° C. and kept at this temperature while adding 2 moles (142 grams) of chlorine through the gas dispenser over a 6-hour period. After all the chlorine had been added, the reaction mixture was cooled to 25° C. After standing overnight, the single phase reaction mixture weighed 788 grams, approximately 5 grams heavier than theory.

The Dry Ice-acetone reflux condenser was replaced with a cold water condenser and 204 ml. of water added through the condenser. During this addition, the reaction flask was cooled and the reaction mass vigorously stirred. The two-phase reaction mixture was then warmed to 60° C. and transferred to a separatory funnel where it was kept at approximately 60° C. for one-half hour. A heavy organic layer weighing 705 grams was recovered. Distillation of the aqueous portion without a column and into a Barrett trap yielded, in a period of about 10 minutes, an additional 3 grams of organic material which was combined with the organic layer. Analysis by gas-liquid chromatography showed the organic layer to consist of 51% 1,1,1-trichloroacetone, 46.45% 1,1,1,3-tetrachloroacetone and 2.6% pentachloroacetone. The conversion to tetrachloroacetone was 42% and to pentachloroacetone was 1.95%. The yields based on trichloroacetone were 95.5% for tetrachloroacetone and 4.43% for pentachloroacetone.

*Example 3*

Into a three-necked one-liter reaction flask, fitted with a stirrer, a gas dispenser, a thermometer well and Dry Ice-acetone reflux condenser, 4 moles (646 grams) of 1,1,1-trichloroacetone were introduced followed by 0.69 mole (68 grams; 0.172 mole equivalent) of 99.4% sulfuric acid. The reaction mixture was stirred and warmed to a temperature of 25° C. and kept at this temperature while adding 1 mole (71 grams) of chlorine through the gas dispenser over a 6-hour period.

The Dry-Ice-acetone reflux condenser was replaced with a cold water condenser and 204 ml. of water added through the condenser while the reaction flask was cooled and the reaction mass vigorously stirred. The two-phase reaction mixture was then warmed to 60° C. and transferred to a separatory funnel where it was kept at approximately 60° C. for one-half hour. A heavy organic layer weighing 675 grams was recovered. Analysis by gas-liquid chromatography showed the organic layer to consist of 75.1% 1,1,1-trichloroacetone, 24.0% 1,1,1,3-tetrachloroacetone and 0.96% pentachloroacetone. The conversion to tetrachloroacetone was 20.7% and to pentachloroacetone was 0.7%. The yield based on trichloroacetone was 96% for tetrachloroacetone and 3.26% for pentachloroacetone.

Various modifications and equivalents will be apparent to one skilled in the art and may be made in the method of the present invention without departing from the spirit or scope thereof, and it is therefore to be understood that the invention is to be limited only by the scope of the appended claims.

I claim:

1. A process for the purification of a 1,1,1-trihalo-3-chloroacetone, having a water-soluble impurity selected from the group consisting of sulfuric acid, hydrochloric acid, and acetone associated therewith, which comprises adding an amount of water sufficient to dissolve the water-soluble impurity and adjusting the temperature of the system to a value of at least 45° C., and separating the aqueous phase containing the water-soluble impurity from said 1,1,1-trihalo-3-chloroacetone while the temperature of the system is maintained at a value of at least 45° C.

2. A process for the purification at a temperature above room temperature of 1,1,1-trihalo-3-chloroacetone which forms a water-insoluble hydrate and having residual sulfuric acid associated therewith as an impurity, which comprises adding an amount of water sufficient to dissolve said sulfuric acid and adjusting the temperature of the system to a value of at least 45° C., and separating the aqueous phase containing the sulfuric acid from said 1,1,1-trihalo-3-chloroacetone while the temperature of the system is maintained at a valve of at least 45° C.

3. A process for the purification of 1,1,1,3-tetrachloroacetone having residual sulfuric acid associated therewith as an impurity, which comprises adding an amount of water sufficient to dissolve the sulfuric acid and adjusting the temperature of the system to a value of at least 45° C., and separating the aqueous phase containing the sulfuric acid from the 1,1,1,3-tetrachloroacetone while the temperature of the system is maintained at a value of at least 45° C.

4. A process according to claim 3, wherein the temperature is maintained within the range of 55° to 65° C.

5. A process for the purification of 1-bromo-1,1,3-trichloroacetone having residual sulfuric acid associated therewith as an impurity which comprises adding an amount of water sufficient to dissolve the sulfuric acid and adjusting the temperature of the system to a value of at least 45° C., and separating the aqueous phase containing the sulfuric acid from the 1-bromo-1,1,3-trichloroacetone while the temperature of the system is maintained at a value of at least 45° C.

6. A process for the purification of a 1,1,1-trihalo-3-chloroacetone having residual sulfuric acid associated therewith as an impurity, which comprises adding an amount of water sufficient to dissolve said sulfuric acid to form a solution having a concentration of about 20% to about 25% and adjusting the temperature of the system to a value of at least 45° C., and separating the aqueous phase containing the sulfuric acid from said 1,1,1-trihalo-3-chloroacetone while the temperature of the system is maintained at a valve of at least 45° C.

7. A process for the purification of 1,1,1,3-tetrachloroacetone having residual sulfuric acid associated therewith as an impurity which comprises adding an amount of water sufficient to dissolve said sulfuric acid to form a solution having a concentration of about 20% to about 25% and adjusting the temperature of the system to a value of at least 45° C., and separating the aqueous phase containing the sulfuric acid from said 1,1,1,3-tetrachloroacetone while the temperature of the system is maintained at a value of at least 45° C.

8. A process according to claim 7, wherein the purification temperature is maintained within a range of 55° to 65° C.

9. A process for the purification of 1-bromo-1,1,3-trichloroacetone having residual sulfuric acid associated therewith as an impurity, which comprises adding an amount of water sufficient to dissolve said sulfuric acid to form a solution having a concentration of about 20% to about 25% and adjusting the temperature of the system to a value of at least 45° C., and separating the aqueous phase containing the sulfuric acid from said 1-bromo-1,1,3-trichloroacetone while the temperature of the system is maintained at a value of at least 45° C.

References Cited

McBee et al.: J. Am. Chem. Soc. 74, 3902–3904 (1952).

LEON ZITVER, *Primary Examiner.*

D. D. HORWITZ, *Assistant Examiner.*